United States Patent [19]

Stanley et al.

[11] Patent Number: 5,024,500
[45] Date of Patent: Jun. 18, 1991

[54] CANTILEVER BEAM RADIATION DEFLECTOR ASSEMBLY

[75] Inventors: Ian W. Stanley, Ipswich; John N. Shepherd, Birmingham; Peter S. Dobson, Stourport, all of England

[73] Assignee: British Telecommunications public limited company, United Kingdom

[21] Appl. No.: 282,337

[22] PCT Filed: Mar. 31, 1988

[86] PCT No.: PCT/GB88/00262
§ 371 Date: Dec. 2, 1988
§ 102(e) Date: Dec. 2, 1988

[87] PCT Pub. No.: WO88/07697
PCT Pub. Date: Oct. 6, 1988

[30] Foreign Application Priority Data
Apr. 2, 1987 [GB] United Kingdom ............... 8707854

[51] Int. Cl.⁵ ............................................. G02B 6/26
[52] U.S. Cl. ............................ 350/96.15; 350/96.13; 350/96.2
[58] Field of Search ............. 350/96.13, 96.15, 96.2, 350/96.21

[56] References Cited

U.S. PATENT DOCUMENTS

| | | | |
|---|---|---|---|
| 1,438,974 | 0/1922 | Wente | 324/97 |
| 2,586,531 | 10/1958 | Brouwer | 182/127 |
| 2,920,529 | 1/1960 | Blythe | 350/487 |
| 3,443,243 | 5/1969 | Patel | 372/20 |
| 3,758,199 | 0/1973 | Thaxter | 350/285 |
| 4,115,747 | 9/1978 | Sato | 372/26 |
| 4,182,544 | 1/1980 | McMahon | 350/96.16 |
| 4,303,302 | 12/1981 | Ramsey et al. | 350/96.2 |
| 4,317,611 | 3/1982 | Petersen | 350/6.6 |
| 4,450,563 | 5/1984 | Bepko | 372/23 |
| 4,626,066 | 12/1986 | Levinson | 350/96.18 |
| 4,657,339 | 4/1987 | Fick | 350/96.2 |
| 4,669,817 | 6/1987 | Mori | 350/96.15 |
| 4,674,828 | 6/1987 | Takahashi et al. | 350/96.13 |
| 4,675,521 | 6/1987 | Sugimoto | 250/227 |
| 4,684,208 | 8/1987 | Ishikawa et al. | 350/96.15 |
| 4,705,349 | 11/1987 | Reedy | 350/96.15 |
| 4,854,658 | 8/1989 | Stanley | 350/96.15 |
| 4,867,532 | 9/1989 | Stanley | 350/162.23 |
| 4,871,244 | 10/1989 | Stanley | 350/486 |

FOREIGN PATENT DOCUMENTS

| | | | |
|---|---|---|---|
| 00010000 | 3/1979 | European Pat. Off. | |
| 0040302 | 11/1981 | European Pat. Off. | |
| 0098815 | 1/1984 | European Pat. Off. | 350/96.13 |
| 3437489 | 4/1986 | Fed. Rep. of Germany | 350/96.13 |
| 3641707 | 6/1988 | Fed. Rep. of Germany | 350/96.15 |
| 57-24902 | 2/1982 | Japan | 350/96.13 |
| 58-7601 | 1/1983 | Japan | 350/96.13 |
| 59-197002 | 11/1984 | Japan | 350/96.15 |
| 63-85711 | 4/1988 | Japan | 350/96.14 |
| 2127987 | 4/1984 | United Kingdom | |
| 2189047 | 10/1987 | United Kingdom | |

OTHER PUBLICATIONS

*IEEE Transactions on Microwave Theory and Techniques*, vol. MTT-30, No. 10, Oct. 1982, M. Spitzer et al., "Development of an Electrostatically Bonded Fiber Optic Connection Technique", pp. 1572–1576 (see p. 1572, col. 1, lines 19,20,31–39; p. 1575, col. 2, lines 45–51; FIG. 3).

*IBM Journal of Research and Development*, vol. 24, No. 5, Sep. 1980 (Armonk, N.Y. U.S.) K. Petersen, "Silicon
(List continued on next page.)

Primary Examiner—John D. Lee
Assistant Examiner—John Ngo
Attorney, Agent, or Firm—Nixon & Vanderhye

[57] ABSTRACT

A micromechanical cantilever beam (1) for use in an optical switch or other radiation deflector assembly includes a beam portion (2) comprising two parallel arms (5,6) hinged at one end to a supporting substrate (4) and at the other end to a load portion (3) which provides the major proportion of the total mass of the cantilever beam. The beam is deflected by the application of an electrostatic potential between electrodes on opposing surfaces (8,9) of the load portion and the supporting substrate respectively. The structure has improved switching performance in operation.

17 Claims, 6 Drawing Sheets

OTHER PUBLICATIONS

Torsional Scanning Mirror", pp. 631–637 (see p. 631, col. 2, lines 15–23; FIG. 3).
*IBM Technical Disclosure Bulletin*, vol. 27, No. 2, Jul. 1984, "Array Light Valve Switches Information Signals Between Fiber-Optic Signal Conductors" by M. B. Callaway et al, pp. 1119–1120.
Patent Abstracts of Japan, vol. 6, No. 2 (P096)(880) 8 Jan. 1982, and JP, A, 56 126818 (Nippon Denshin Denwa Kosha K.K.) 5 Oct. 1981.
Patent Abstracts of Japan, vol. 9, No. 257 (P-396)(1980), 15 Oct. 1985, and JP, A, 60 107532 (Toshiba K.K.) 13 Jun. 1985.
J. Electrochem. Soc: Solid–State Science and Technology, Dec. 1980 "Miniature Cantilever Beams Fabricated by Anisotropic Etching of Silicon" by Jolly et al, pp. 2750–2754.
*Proceedings of the IEEE*, vol. 70, No. 5, May 1982, "Silicon as a Mechanical Material", Petersen, pp. 420–457.

| STAGE | FRONT | REVERSE |

CANTILEVER BEAM RADIATION DEFLECTOR ASSEMBLY

BACKGROUND AND SUMMARY OF THE INVENTION

The present invention relates to radiation deflectors and radiation deflector assemblies and in particular to radiation deflectors and assemblies of the kind described in U.S. Pat. No. 4,854,658, issued Aug. 8, 1989 in the name of the present applicants. Commonly assigned U.S. Pat. Nos. 4,871,244 and 4,867,532 also show similar apparatus and methods for deflecting optical beams and selecting wavelengths of radiation.

Radiation deflector assemblies described in U.S. Pat. No. 4,854,648 comprise at least three radiation waveguides; a controllable radiation deflector positioned such that when the deflector is in a first position radiation passes between one combination of two of the waveguides, and when the deflector is in a second position radiation passes between another combination of two of the waveguides; and control means responsive to control signals for controlling the position of the deflector. In the specific embodiment described in U.S. Pat. No. 4,854,648 the deflector comprises a cantilever beam mounted and hinged in a common substrate with the waveguides. This configuration of radiation deflector assembly hereinafter referred to as "of the kind described" eases the problem of accurately aligning the waveguides with the deflector.

Radiation deflector assemblies of the kind described find application as radiation switches; for example, as optical switches in optical transmission systems.

One problem with the construction of radiation deflector assemblies of the kind described is the need to make the radiation deflector attain equilibrium as rapidly as possible on switching, without excessive resonant oscillation. The deflector must also have a minimum displacement sufficient to deflect radiation by a distance at least equal to the separation between each of the waveguides in respective waveguide pairs.

It is further desirable that where the control means requires a driving potential to control deflection of the deflector, this driving potential is minimised.

It is an object of the present invention to provide improved radiation deflectors and deflector assemblies of the kind described which resolve or at least partially mitigate one or more of these aforementioned problems.

According to the present invention a radiation deflector comprises a deflectable cantilever beam of which one end is free and one end is hinged to a supporting substrate wherein the cantilever beam has its centre of mass closer to the free end of the beam than to the hinged end.

Also according to the present invention a radiation deflector assembly of the kind described comprising a deflectable cantilever beam of which one end is free and one end is hinged to a supporting substrate is characterised in that the cantilever beam has its centre of mass closer to the free end of the beam than to the hinged end.

Conveniently, the cantilever beam comprises a beam portion hinged to the substrate and a load portion at the free end of the beam portion. Preferably the load portion provides the major proportion of the total mass of the cantilever beam as a whole, the centre of mass of the load portion being arranged to be positioned at or near the free end of the beam portion.

It has been found that a cantilever beam radiation deflector according to the present invention facilitates the more rapid attainment of equilibrium on switching.

Preferably the length of the beam portion and the mass of the load portion are selected such that the first natural resonant frequency of the cantilever beam is much greater than the maximum frequency at which the deflector is to be switched between positions.

Conveniently, in a radiation deflector assembly according to the invention, the control means comprises means for applying an electrostatic potential for displacing the cantilever beam deflector. The control means may include an electrode arranged such that the displacement force provided by an applied electrostatic potential effectively acts at the centre of mass of the load portion.

Conveniently, the electrostatic potential may be applied to a side surface, being a surface of the load portion substantially parallel to the longitudinal axis of the undisplaced beam portion. Preferably the area of the side surface is made relatively great in order to reduce the electrostatic potential required to provide the necessary displacement force.

BRIEF DESCRIPTION OF THE DRAWINGS

Embodiments of the invention will now be described in detail and by way of example with reference to the accompanying drawings in which.

DETAILED DESCRIPTION OF THE DRAWINGS

Figure 1:
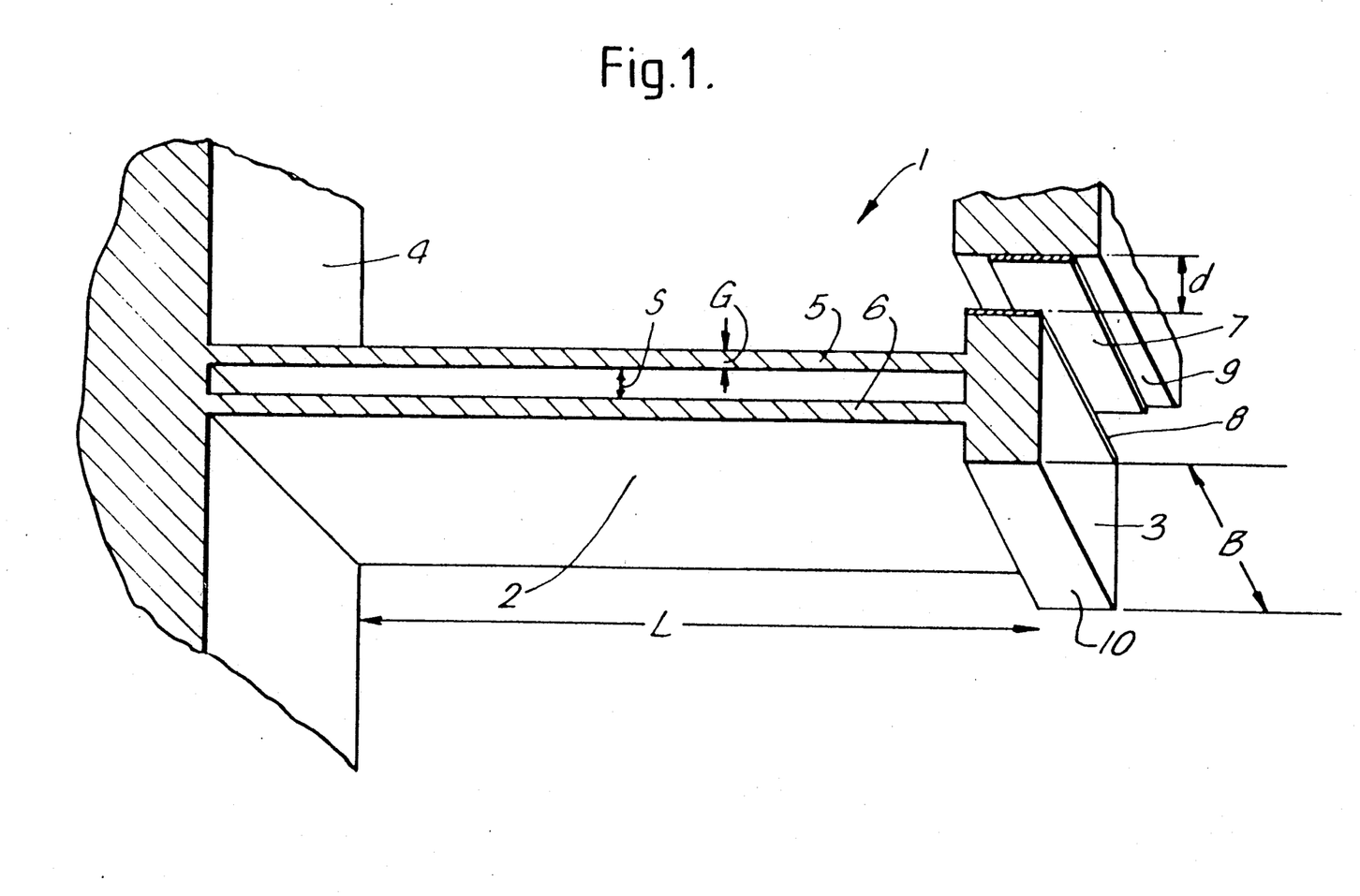
FIG. 1 is a schematic illustration of a cantilever beam radiation deflector according to the present invention.

In FIG. 1 a cantilever beam radiation deflector 1 comprises a beam portion 2 which extends out from the body of supporting substrate 4 and carries a load portion, or end mass 3, at the end not attached to the substrate. In this embodiment the beam portion 2 is formed of two parallel arms 5, 6. An area 9 of the supporting substrate 4 adjacent to the end mass 3 is provided with an electrode 7 disposed parallel to and opposite a lateral surface 8 of the end mass 3. The surface 8 is shown also provided with an electrode.

In operation, the cantilever may be deflected by applying an electrostatic potential between the electrodes. The parallel arms 5, 6 are adapted to flex at the joints to the body of the substrate 4 and at the joints to the end mass 3. This arrangement permits the electrode surfaces to remain parallel even when the beam portion is deflected.

Figure 2:
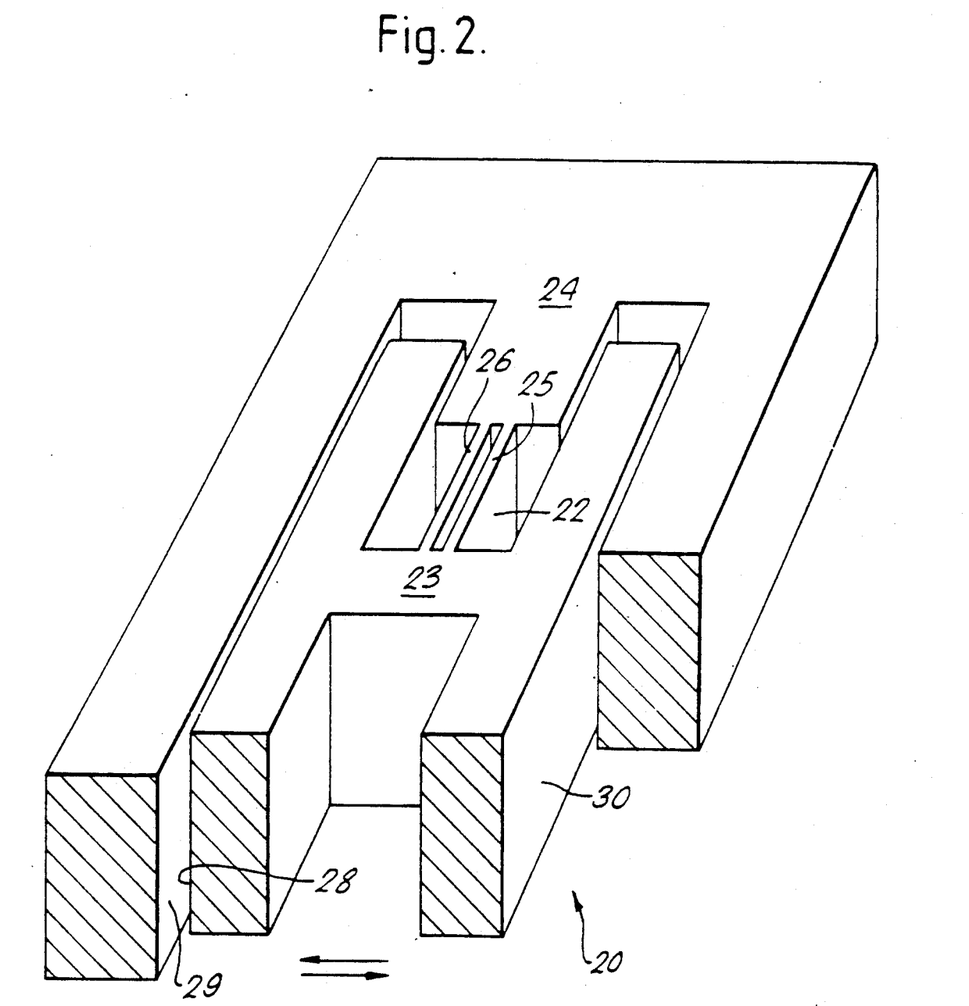
FIG. 2 is a cutaway perspective view of a substrate with a cantilever beam radiation deflector according to the present invention.

FIG. 2 is a cutaway perspective view of an alternative cantilever beam radiation deflector 20. The cantilever beam deflector 20 again comprises a beam portion 22 formed of two parallel arms 25, 26, extending out from a supporting substrate 24, together with a massive load portion, or end mass 23. The load portion 23 in this instance is H-shaped and is arranged to have its centre of mass in the plane of the attachment of the load portion to the two parallel arms 25, 26.

In this configuration the sides 28, 30 of the load portion 23 are readily available for use with electrostatic electrodes. The proportionately large area of these sides reduces the magnitude of the electrostatic driving potential needed to displace the deflector.

Figure 3:
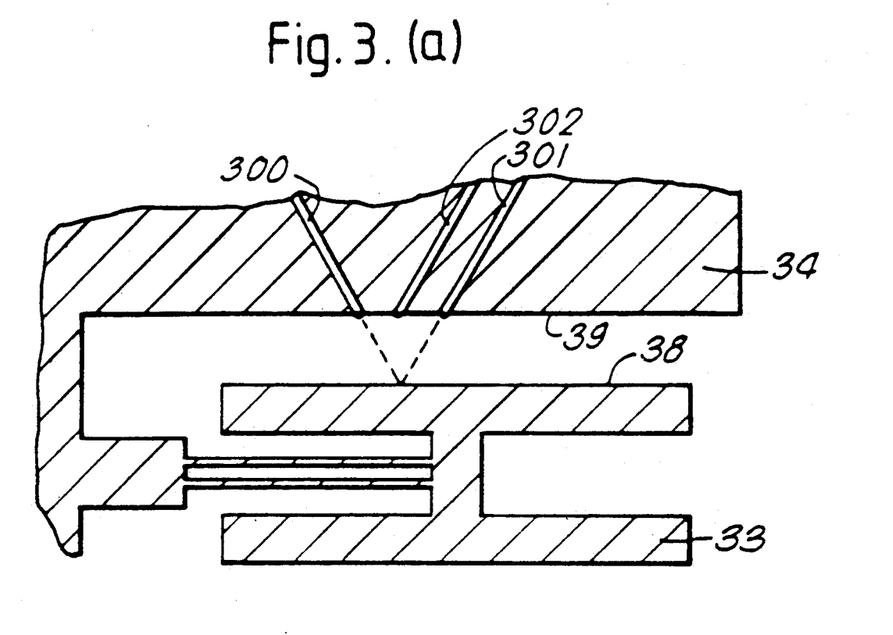
FIGS. 3(a) and 3(b) illustrate one mode of operation of a radiation deflector according to the invention.

One mode of operation of a radiation deflector assembly of the kind described is illustrated in plan schematic in FIG. 3. As in FIG. 2, the deflector shown comprises an H-shaped load portion 33 attached to a supporting substrate 34 by two parallel arms 35, 36. Three waveguides 300, 301, 302 are provided in the substrate 34 and are arranged such that radiation passed along the waveguides is deflected off one side surface 38 of the load portion 33. The side surface 38 is provided with a coating exhibiting suitably high reflectivity at the operating wavelength $f_o$.

In FIG. 3(a) the radiation deflector is undisplaced from its equilibrium position and radiation is directed between the two waveguides 300 and 301, as shown by the dotted line. In FIG. 3(b) the radiation deflector is displaced towards the waveguides by means of electrostatic attraction between electrodes on the opposing faces 38, 39 of the load portion 33 and the supporting substrate 34, respectively. In this position radiation is directed between waveguides 300 and 302, again as shown by the dotted line.

Figure 4:
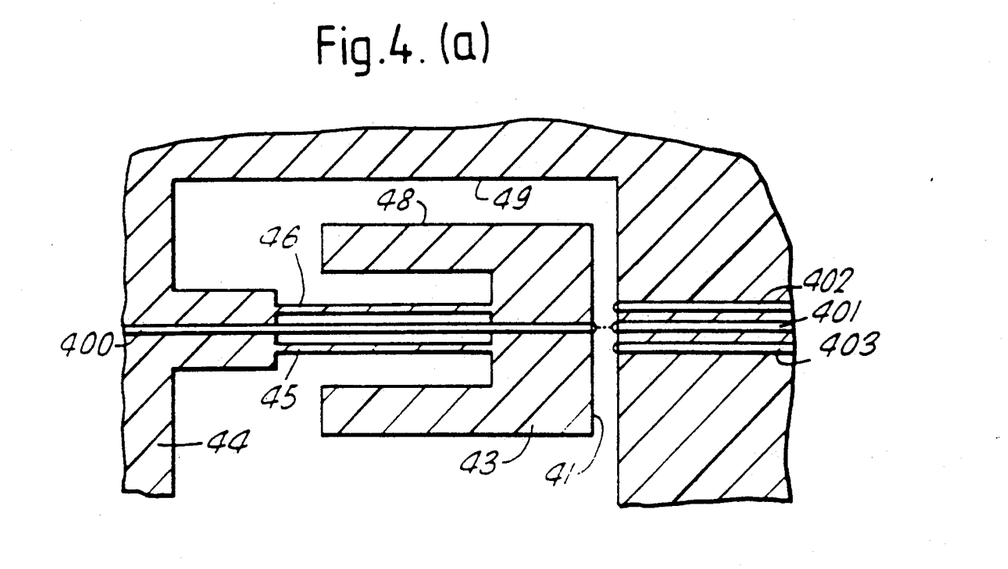
FIGS. 4(a) and 4(b) illustrate an alternative mode of operation.

An alternative embodiment and mode of operation is illustrated in FIG. 4. In this embodiment a waveguide 400 is mounted longitudinally along the beam portion of the deflector and parallel with the arms 45, 46. This waveguide 400 terminates at the end face 41 of the load portion 43. Three further waveguides 401, 402, 403 are mounted in the substrate 44 and terminate at the face 42 of the substrate opposing the end face 41 of the load portion 43. Electrostatic potential is applied between electrodes on opposing side faces 48, 49 of the load portion 43 and substrate 44, respectively, to displace the deflector.

In the undisplaced equilibrium position of FIG. 4(a) radiation is coupled between the waveguide 400 on the cantilever deflector and the central waveguide 401 on the supporting substrate. In FIG. 4(b), the cantilever is displaced to couple radiation between the waveguide 400 on the cantilever deflector and the waveguide 402 on the main body of the substrate. If the cantilever were displaced in the opposite sense clearly radiation would be coupled between the cantilever waveguide 400 and the third other waveguide 403.

For optical radiation the waveguide 400 mounted on the cantilever may be an optical fibre stripped of the usual cladding and comprising the central core alone. Such a waveguide would be flexible enough to move with the cantilever beam portion and dimensionally of the appropriate scale. Over the small distances involved the excess loss introduced by an unclad fibre such as this would be negligible.

It will be apparent that radiation could be deflected into additional waveguides by suitably adjusting the degree and direction of displacement of the cantilever in both the example embodiments described here and in other embodiments within the scope of the invention.

In order to appreciate the advantages of the embodiments of the invention it is useful to analyse the mechanical characteristics of a cantilever beam, using the notation as shown in FIG. 1.

Assuming that the only force acting on the cantilever is a concentrated force, P, at the free end, then the maximum displacement $y_o$ may be expressed as:

$$y_o = \frac{-PL^3}{3EI} \quad (1)$$

where L is the length of the beam and EI is the elastic stiffness of the beam. E is the elastic modulus and I is the second moment of area which may be expressed as:

$$I = \frac{BG(S + 2G)(S + G)}{6} \quad (2)$$

where B is the depth of the beam, G is the arm thickness and S is the arm separation.

Where the force P is applied by an electrostatic potential V acting over an area A, the magnitude of the force is given by:

$$P = V^2 A \epsilon_o / d^2 \quad (3)$$

where $\epsilon_o$ is the permittivity of free space and d is the separation of the cantilever from the substrate electrode.

The first resonant frequency f of this device is given by:

$$f = 2\pi\omega = \frac{1}{2\pi} [3EI/L^3(M + 0.23m)]^{0.5} \quad (4)$$

where m and M are the masses of the cantilever beam portion and end mass respectively and $\omega$ is the natural frequency of the cantilever.

For switching applications, it is important to damp the transient vibrations as soon as possible after switching. The critical damping, C, for such a device is given by:

$$C = 2 m\omega \quad (5)$$

and the rate at which the amplitude diminishes is exponential and is given by:

$$y = y_o \exp[-\omega t] \quad (6)$$

From the theoretical treatment above it is possible to observe how the geometrical parameters of the cantilever beam influence the mechanical response, in terms of amplitude of deflection and natural resonance, of the deflector.

For a given set of dimensional constraints, the maximum switching displacement will be determined by the electrode separation, d. As d increases then, according to Equation (3), the potential V required to displace the deflector must likewise increase. This increase can be offset by making the area A over which the potential is applied as large as possible within the practical limitations, as shown in the embodiment of FIG. 2, for example.

From Equations (4) and (5) it is apparent that the mass of the load portion has two significant effects. A larger mass increases the rate at which the cantilever attains equilibrium, but at the same time it decreases the first resonant frequency. The decrease in resonant frequency which goes with a larger mass can be compensated to some extent by increasing the moment of area I, or by decreasing the length L of the beam portion. However, changes in these parameters both involve increasing the resonant frequency at the expense of the maximum displacement, $y_o$. Consequently, in the limit, it is preferable to increase I or decrease L such that $y_o = d$ for a given applied electrostatic potential.

For the purposes of demonstration, some characteristics of a cantilever deflector as shown in FIG. 2 have been modelled for certain selected performance criteria. The selected criteria were that:
(i) the resonant frequency should be greater than 5 KHz;
(ii) the maximum electrostatic potential for deflection should be below 100 V; and
(iii) the minimum electrode spacing should be 10 μm.

These figures were chosen as examples only and as such are representative rather than uniquely ideal. Similarly, the ranges of geometric parameters used in the calculations were likewise chosen as representative and should not be taken to imply any specific limitations. The choice of criteria and geometric parameters in a particular practical case must be made according to the conditions relevant to that individual case. The examples here are for general guidance alone.

Figure 5:
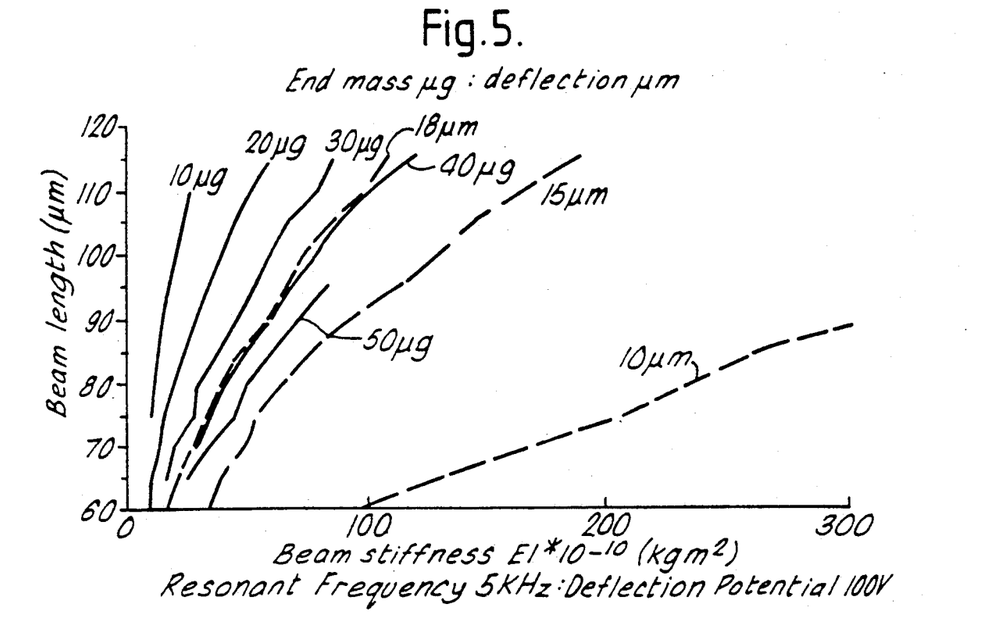
FIG. 5 is a graph illustrating the ranges of beam geometries appropriate for desirable performance criteria.

In FIG. 5 the solid curves show the variation in beam stiffness with beam length for end masses M of 10-50 μg. These curves represent the limiting range of beam geometries (i.e. length and cross-section) which have a resonant frequency of 5 KHz for the given end mass. The dashed curves represent beam geometries which are able to deflect to the full electrode spacing (d = 10, 15, 18 μm) with a maximum applied potential of 100 V. In between a pair of these curves (one solid, one dashed) exist windows inside which the three performance criteria are met.

Figure 6:
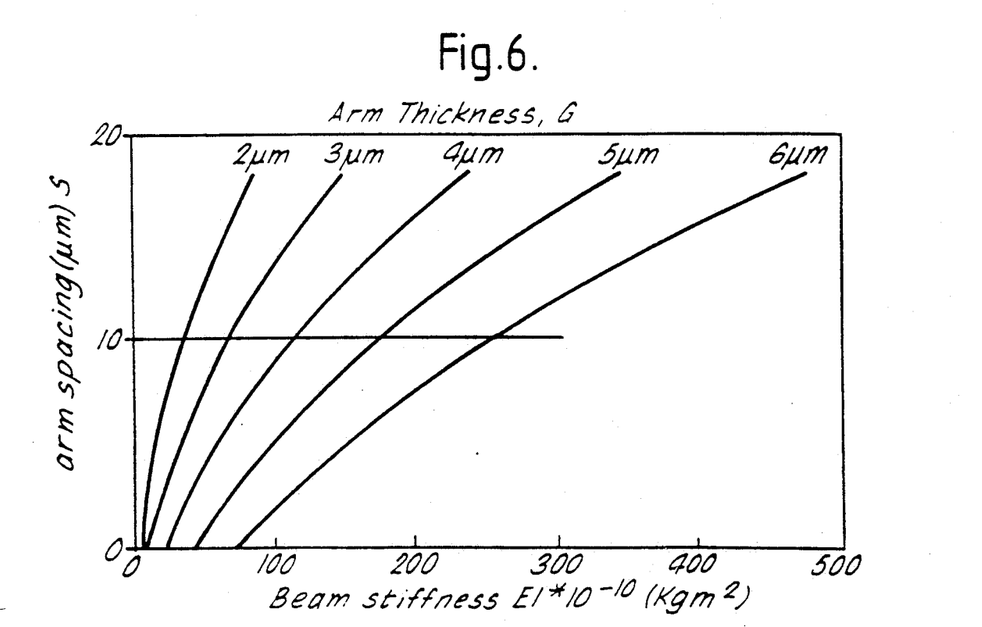
FIG. 6 is a graph of cantilever stiffness versus arm spacing and thickness for a cantilever with a beam portion comprising two parallel arms.

In FIG. 6 the stiffness of the cantilever, EI, is plotted as a function of the arm spacing, S for various arm thicknesses, G.

It can be seen that the twin arm beam structure enables beam stiffness appropriate to a specific situation to be easily selected from a wide range by varying the arm thickness. The twin arm structure of the beam portion thus provides design flexibility in addition to permitting the faces of the load portion to remain oriented in the same direction whether the beam portion is deflected or not, as described earlier. Furthermore, this structure is also convenient for fabrication.

Figure 7:
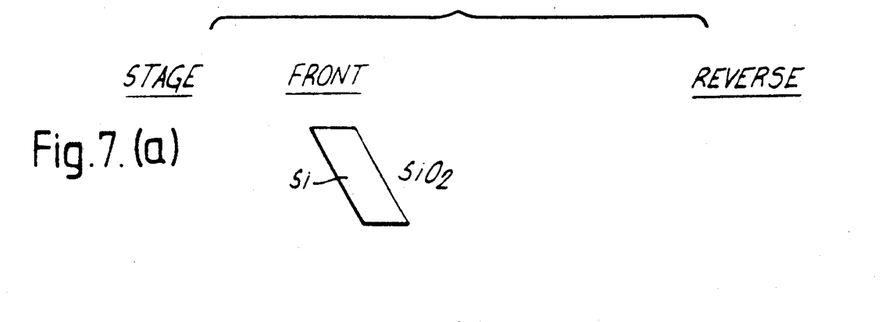
FIGS. 7(a)–7(d) illustrate the stages in an exemplary method of fabrication of a cantilever beam radiation deflector according to the invention in a silicon substrate.

One method of fabrication of a deflector according to the invention using a (110) silicon substrate is shown diagrammatically in FIG. 7. Using the notation of the Miller indices, (110) silicon has two of the four {111} planes perpendicular to the surface, aligned along the <112> surface directions. These two 'vertical' {111} planes of interest intersect each other at an angle of 70.53°. The remaining two {111} planes form an angle of 35.26° to the surface, but are not employed in this construction.

The exemplary method of device fabrication illustrated in FIG. 7 involves four masking levels and two anisotropic etching stages, both through the whole silicon wafer thickness. The fabrication of the vertical beams involves a combination of micromachining and silicon planar technology to define the deflector geometry and to align the beams accurately along <112> directions. The structures are etched using electrochemically controlled ethylene diamine as an anisotropic etchant. The main steps are:

(a) Thermal oxidation followed by photolithographic definition of the beam length and exposure of a window in the silicon equivalent to the spacing between the twin arms.
(b) Etching of a slot through the exposed silicon and subsequent photolithographic definition of the end mass and areas of the supporting substrate which will eventually form the adjacent electrode surfaces.
(c) Diffusion into the exposed {111} planes of the slot to define the arm thicknesses. This provides an accurate and reproducible method of controlling the thickness of the cantilever arms. The concentration dependence of the next anisotropic etch is used as a fine tune of the arm thickness. Further diffusion is made into the areas lithographically defined in the previous step.
(d) Masking to define the free beam and etching the exposed silicon to provide the end mass and appropriate electrode spacing.
(e) A final metallisation stage employing a shadow mask in (100) silicon and sputtering of aluminium through this mask to define the contact regions and create the electrodes between the end mass and the bulk of the substrate. Sputtering from both sides of the silicon wafer and annealing provides a uniform metallisation across the wafer thickness.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A radiation deflector comprising
a deflectable cantilever beam wherein one end is free and the other end is integral with a supporting substrate and
wherein the cantilever beam has its centre of mass closer to the free end of the beam than to the hinged end.

2. A radiation deflector according to claim 1 wherein the cantilever beam comprises
a beam portion and a load portion at the free end of the beam portion and
the load portion provides the major proportion of the total mass of the cantilever beam.

3. A radiation deflector assembly comprising:
at least three radiation waveguides;
a controllable radiation deflector positioned such that when the deflector is in a first position, radiation passes between one combination of two of the waveguides, and when the deflector is in a second position, radiation passes between another combination of two of the waveguides; and
control means responsive to control signals for controlling the position of the deflector
wherein the deflector comprises a cantilever beam having one end free and the other end integral with a supporting substrate on which are mounted waveguides and characterised in that the cantilever beam has its centre of mass closer to the free end of the beam than to the end hinged to the common substrate.

4. A radiation deflector assembly according to claim 3 wherein the cantilever beam comprises a beam portion and a load portion at the free end of the beam portion and the load portion provides the major proportion of the total mass of the cantilever beam.

5. A radiation deflector assembly according to claim 4 wherein the length of the beam portion and the mass of the load portion are selected such that the first natural resonant frequency of the cantilever beam is substantially greater than the maximum frequency at which the deflector is to be switched between positions.

6. A radiation deflector assembly according to claim 3 or claim 4 wherein the control means comprises means for applying an electrostatic potential for displacing the cantilever beam deflector.

7. A radiation deflector assembly according to claim 6 wherein the control means includes an electrode arranged such that the displacement force provided by an applied electrostatic potential effectively acts at the centre of mass of the load portion.

8. A radiation deflector assembly according to claim 3 wherein at least one of the waveguides is provided on the cantilever beam.

9. A radiation deflector assembly according to claim 8 wherein the at least waveguide runs longitudinally along the cantilever beam.

10. A radiation deflector comprising an electrostatically deflectable composite cantilever beam having at least two legs connected together in a parallelogram configuration having one end attached to a supporting substrate which provides the only support to the cantilever beam and the other end freely movable between at least two positions to switch optical signals between different optical signal waveguides.

11. A radiation deflector comprising:
an electrostatically deflectable composite cantilever beam including at least two parallel separated component legs connected together at each end wherein one end of the composite beam is attached to a supporting substrate which provides the only support to the cantilever beam and the other end of the composite beam is unsupported at all times and freely movable, and wherein said parallel legs of the composite beam remain parallel to each other during a full range of beam deflection.

12. A radiation deflector comprising:
a composite deflectable cantilever beam including a pair of parallel legs connected in a parallelogram configuration wherein one end of the composite beam is attached to a supporting substrate and the other end is freely movable and including attached opposing lateral surfaces connected to the free end of the beam which remain parallel to the substrate during deflection to different operative positions; and a control means for displacing the free end of the beam, said control means including electrodes for producing an electrostatic potential between at least one of said lateral surfaces and said substrate.

13. The radiation deflector of claim 12 wherein said composite beam carries at least one radiation waveguide.

14. The radiation deflector of claim 12 further comprising:
at least three radiation waveguides, wherein when the beam is in a first position, radiation passes between one combination of two of the waveguides, and when the beam is in a second position, radiation passes between another combination of two of the waveguides.

15. The radiation deflector of claim 14 wherein the substrate contains all of the waveguides.

16. The radiation deflector of claim 14 wherein the beam contains at least one radiation waveguide.

17. A radiation deflector comprising:
a deflectable composite cantilever beam having two parallel legs connected together in a parallelogram configuration with one end attached to a supporting substrate which provides the only support to the cantilever beam and the other end of the beam being freely movable; and at least three radiation waveguides, wherein when the beam is in a first position, radiation passes between one combination of two of the waveguides, and when the beam is in a second position, radiation passes between another combination of two of the waveguides.

* * * * *